United States Patent
Wang et al.

(10) Patent No.: US 7,509,127 B2
(45) Date of Patent: Mar. 24, 2009

(54) MBMS PTP AND PTM CHANNEL CHANGE

(75) Inventors: Hong Wang, Beijing (CN); Detao Li, Beijing (CN); Chunying Sun, Beijing (CN); Xiaoqiang Li, Beijing (CN)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 53 days.

(21) Appl. No.: 10/525,144

(22) PCT Filed: Aug. 14, 2003

(86) PCT No.: PCT/KR03/01649

§ 371 (c)(1),
(2), (4) Date: Oct. 13, 2005

(87) PCT Pub. No.: WO2004/017580

PCT Pub. Date: Feb. 26, 2004

(65) Prior Publication Data

US 2006/0154627 A1    Jul. 13, 2006

(30) Foreign Application Priority Data

Aug. 16, 2002  (CN) ............................. 02 1 30570

(51) Int. Cl.
*H04Q 7/20* (2006.01)
(52) U.S. Cl. .................. 455/439; 455/442; 455/524; 455/525; 455/503
(58) Field of Classification Search ............ 455/433, 455/452.1, 452.2, 454, 463, 503, 80, 560, 455/135, 439, 442, 525, 524; 370/395.64, 370/331, 352, 395.5, 395.21, 349, 522
See application file for complete search history.

(56) References Cited

U.S. PATENT DOCUMENTS 6,701,155 B2 *  3/2004  Sarkkinen et al. ........... 455/515

(Continued)

FOREIGN PATENT DOCUMENTS

WO      WO 01/31948      5/2001

(Continued)

OTHER PUBLICATIONS

3rd Generation Partnership Project; Technical Specification Group Radio Access Network; Introduction of the Multimedia Broadcast Multicast Service (MBMS) in the Radio Access Network (Stage 2); Release 6,May 2002.

(Continued)

*Primary Examiner*—Duc Nguyen
*Assistant Examiner*—Dominic E Rego
(74) *Attorney, Agent, or Firm*—The Farrell Law Firm, PC

(57) ABSTRACT

A channel type switching method for Multimedia Broadcast and Multicast Service (MBMS) point-to-point (P-t-P) channel and point-to-multi point (P-t-M) channel is provided. When a user equipment (UE) moves to a cell in a drift radio network controller (DRNC) with an Iur interface, the DRNC decides to switch between a common channel and a dedicated channel and then notifies a serving radio network controller (SRNC) of MBMS channel type and common channel parameters.

11 Claims, 9 Drawing Sheets

U.S. PATENT DOCUMENTS

| | | | |
|---|---|---|---|
| 7,031,722 B2* | 4/2006 | Naghian | 455/456.1 |
| 2002/0025815 A1* | 2/2002 | Rune et al. | 455/436 |
| 2002/0107019 A1* | 8/2002 | Mikola et al. | 455/436 |
| 2003/0134653 A1* | 7/2003 | Sarkkinen et al. | 455/517 |
| 2003/0157947 A1* | 8/2003 | Fiatal et al. | 455/466 |
| 2004/0081192 A1* | 4/2004 | Koulakiotis et al. | 370/432 |
| 2004/0102194 A1* | 5/2004 | Naghian et al. | 455/436 |
| 2004/0102200 A1* | 5/2004 | Palkisto et al. | 455/466 |
| 2004/0209618 A1* | 10/2004 | Niemela et al. | 455/445 |
| 2005/0021601 A1* | 1/2005 | Longoni et al. | 709/203 |
| 2005/0151840 A1* | 7/2005 | Hurtta | 348/61 |
| 2005/0221849 A1* | 10/2005 | Van Lieshout et al. | 455/509 |
| 2006/0176872 A1* | 8/2006 | Serna et al. | 370/351 |

FOREIGN PATENT DOCUMENTS

| | | |
|---|---|---|
| WO | WO 2004/002184 | 12/2003 |
| WO | WO 2004/015876 | 2/2004 |

OTHER PUBLICATIONS

Lucent Technologies: "Discussion Paper on Impact of IUR on MBMS IU Bearer Selection" 3GPP TSG SA WG 2 #25, Online, Jun. 24, 2002.

Ericsson: "UTRAN Architectural Aspects in Relation With MBMS", 3GPP TSG-RAN WG2 #30, Online, Jun. 24, 2002-Jun. 28, 2002.

Sachs et al., "Performance of Shared and Dedicated Resources in WCDMA", 2000 IEEE, pp. 759-764.

* cited by examiner

MBMS PTP AND PTM CHANNEL CHANGE

PRIORITY

This application claims priority to an application entitled "MBMS PtP AND PtM CHANNEL CHANGE" filed with the Chinese Patent Office on Aug. 16, 2002 and assigned Serial No. 02130570.6, and an application entitled the same filed with the World Intellectual Property Office on Aug. 14, 2003 and assigned Serial No. PCT/KR2003/001649, the full contents of each of which are incorporated herein by reference.

BACKGROUND OF THE INVENTION

1. Field of the Invention

The present invention relates to a multimedia broadcast and multicast services, more particularly to a channel switching methods of Multimedia Broadcast and Multicast P-t-P and P-t-M channel.

2. Description of the Prior Art

Multimedia Broadcast and Multicast Service (MBMS) is a new Point to Multipoint (P-t-M) service in $3^{rd}$ generation (3G) mobile communication. The type of channel used by MBMS can be a Point to Point (P-t-P) channel or a P-t-M channel according to the number of service users. In current P-t-P service mechanisms, when a user moves to a new cell, a destination cell, a specific channel is used for handovers from the source cell to the destination cell. Existing channel handovers are all based on P-t-P channel and the channel characteristics don't change. In MBMS service, the changing cell may result in changes of channel characteristics.

To better explain the relevant principles, the MBMS system structure is illustrated in FIG. 9.

MBMS network structure adds new network elements based on the core network of General Packet Radio Service (GPRS). Referring to FIG. 9, a broadcast and multicast service center (BM-SC) 01 is the service control center of the MBMS system. A Gateway GPRS Supporting Node (GGSN) 02 and Service GPRS Supporting Node (SGSN) 03 consist of the transmission network of MBMS service and provide a route for data transfer. A Home Location Register (HLR) 06 stores the user-related data and can provide services like user authentication. A UMTS Terrestrial Radio Access Network (UTRAN) 04 provides radio resources for MBMS service in air interface. Uu 07 denotes the radio interface between terminal and radio access network. User Equipment (UE) 05 is the terminal device receiving data. Radio resources used by the MBMS service are not dedicated for one user, but are shared by all users of the service.

In a conventional system, it is up to the Serving Radio Network Controller (SRNC) to decide whether to do the SRNC relocation when the user in the system performs a handover between cells in different RNCs but in the same SGSN. If SRNC relocation is not performed, data and signalling stream are transferred to the Drift Radio Network Controller (DRNC) via Iur interface, and then transferred to the UE from the DRNC. In a handover procedure, different processes are performed according to the different radio connection status of the user.

In Idle mode, CELL_FACH (Cell_Forward Access Channel), CELL_PCH (Cell_Paging Channel) and URA_PCH (UTRAN Registration Area_Paging Channel) statuses, when the UE moves from one cell in the SRNC to a cell in another RNC, this is a drift that is handled by the DRNC. The UE will send a "cell update" message to the DRNC, and the DRNC transfers the message to the SRNC via an Iur interface. The SRNC will communicate with the DRNC to obtain common resource information of the cell in the DRNC to notify the UE. FIG. 7 illustrates the cell update process, which is as follows:

Step 601: After the UE re-selects a cell, it sends a cell update message to the DRNC via common control channel (CCCH) using a radio resource control (RRC) protocol.

Step 602: The DRNC allocates a D-RNTI (DRNC-Radio Network Temporary Identifier) to the UE and then sends an uplink signalling transfer indication message to the SRNC using a radio network subsystem application part (RNSAP).

Step 603: The SRNC decides not to do SRNC relocation and sends a common transport channel resource initialization request message to the DRNC.

Step 604: The DRNC informs the SRNC of the information on a common channel through the message of common transport channel resource initialization response.

Step 605: The SRNC sets up a data bearer on an Iur interface using an access link control application part (ALCAP).

Step 606: The SRNC sends a cell update confirmation message to the UE to inform the UE common channel of information on the new cell and new UE identifier via a dedicated control channel (DCCH) using RRC protocol.

Step 607: The UE responds to the SRNC to complete the cell update process via the DCCH.

Step 608: The SRNC deletes the user's resources on the original cell using RNSAP by sending a common transport channel resources message.

In CELL_DCH (Cell_Dedicated Channel) status, the UE moves to a cell in another RNC. The SRNC decides to handover to another cell according to the measurement reported by the UE and notifies the DRNC of dedicated radio link configurations. After the DRNC completes configuring, the SRNC is informed to notify the UE of the radio link situation after UE handover. FIG. 8 illustrates the cell handover process under this status that occurs as follows:

Step 701: The SRNC decides to set up a new dedicated radio link (RL) for the UE in the new cell of the DRNC. SRNC sends a radio link setup request message to DRNC using RNSAP and informs the DRNC of dedicated channel information.

Steps 702-703: The DRNC sets up a new radio dedicated link with a Node B of the DRNC using a Node B application part (NBAP).

Step 704: The DRNC sends a radio link addition response message to SRNC.

Step 705: The SRNC sets up Iur interface and Iub interface data bearer using ALCAP.

Steps 706-707: Synchronize data frame on downlink and uplink using DCH frame pulse (FP).

Steps 708-709: SRNC notifies the UE to add a new dedicated link via the DCCH by sending an active set update message using the RRC. The UE sends active set update complete message in response to the active set update message.

In conventional systems, the user's signaling and data are all sent to the DRNC via the SRNC, and then the DRNC sends them to the user. MBMS is a new P-t-M service that can use a P-t-P or P-t-M channel for data transfer. The RNC determines channel type according to the number of users applying for the same kind of MBMS service in a cell. When the number of users using the same kind of MBMS service is small, the P-t-P channel is used; when the user number for this service exceeds a certain threshold, the P-t-M channel is used.

Therefore, when the user moves from an SRNC cell to a DRNC cell during cell reselection, the SRNC does not relocate. The DRNC determines the type of MBMS channel, which may result in different MBMS channel types being used before and after handover. So it is necessary to reconfigure MBMS channels used by the user from P-t-P channel to P-t-M channel. Conventional handover technology cannot handle this situation.

After the UE completes the above cell handover process, if the number of MBMS service users change due to the cell users moving in and out of the cell, or other users joining in and leaving the same MBMS service, and the threshold of the number of users is exceeded, the MBMS channel type will change. The current state of the art cannot notify the SRNC of MBMS channel changes and does not allow the SRNC to notify all users in the cell to reconfigure the MBMS channel.

The RNC is responsible for counting the number of users applying for MBMS service. If a handover is made from a cell in the SRNC to a cell in the DRNC during cell handover, SRNC re-positioning is not performed. This presents another problem to be solved since the SRNC needs to notify the DRNC of the MBMS service type applied for by the user to make the DRNC re-count the number of MBMS service users in the cell. Since MBMS is a new service, the conventional handover mechanism is not suitable and sufficient for the MBMS service.

SUMMARY OF THE INVENTION

Accordingly, an object of the present invention is to provide a handover method of channel switching for MBMS service when the UE handovers to another RNC and the SRNC does not re-position.

Another object of the invention is to provide a handover method for MBMS channel type switching when the MBMS channel type changes from users leaving or joining the same MBMS service, or moving in or out of the cell while the UE does not move.

According to one aspect of the invention, a channel type switching method for MBMS Point-to-Point (P-t-P) and Point-to Multi point (P-t-M) channels, when a UE having MBMS service moves to a cell in drift radio network controller (DRNC) which has a Iur interface between a serving radio network controller (SRNC), includes:

The DRNC decides to perform switching channel type between the common channel and the dedicated channel based on the number of users having MBMS service in the cell; and The DRNC notifies the SRNC of MBMS channel type and channel parameters.

According to the present invention, a channel type switching method for multimedia Broadcast and Multicast Service (MBMS) with Point-to-Point (P-t-P) and Point-to-Multi point (P-t-M) channels, in a radio network controller, including:

checking the number of MBMS users in a cell when a user leaves the on-going MBMS service;

determining the MBMS channel type according to the number of users having MBMS and a threshold; and reporting the changes of MBMS channel type to a serving radio network controller (SRNC).

According to the present invention, a channel type switching method for Multimedia Broadcast and Multicast Service (MBMS) with Point-to-Point (P-t-P) and Point-to-Multi point (P-t-M) channels, in a radio network controller, includes:

transmitting an MBMS channel information inquiry message from a Serving Radio Network Controller (SRNC) to a Drift Radio Network Controller (DRNC);

transmitting, upon receiving the channel information inquiry message in the DRNC, MBMS channel type and channel parameters of an MBMS channel to the SRNC; and notifying, in the SRNC, a UE to reconfigure the MBMS channel via a Radio Resource Controller (RRC) message to complete channel switching, wherein the channel type is determined based on the number of users having the MBMS service in the cell.

According to the present invention, a data communication channel establishment method for setting up multimedia broadcast/multicast service (MBMS) with core network (CN) via a drift radio network controller (DRNC), when a UE moves to a cell controlled by the DRNC, includes:

a serving radio network controller (SRNC) sending messages to a DRNC; the DRNC sending an MBMS service request message to the CN;

the CN requesting to set up data connection with the DRNC; and the DRNC sending a response message to the CN.

DETAILED DESCRIPTION OF THE PREFERRED EMBODIMENTS

Figure 1:
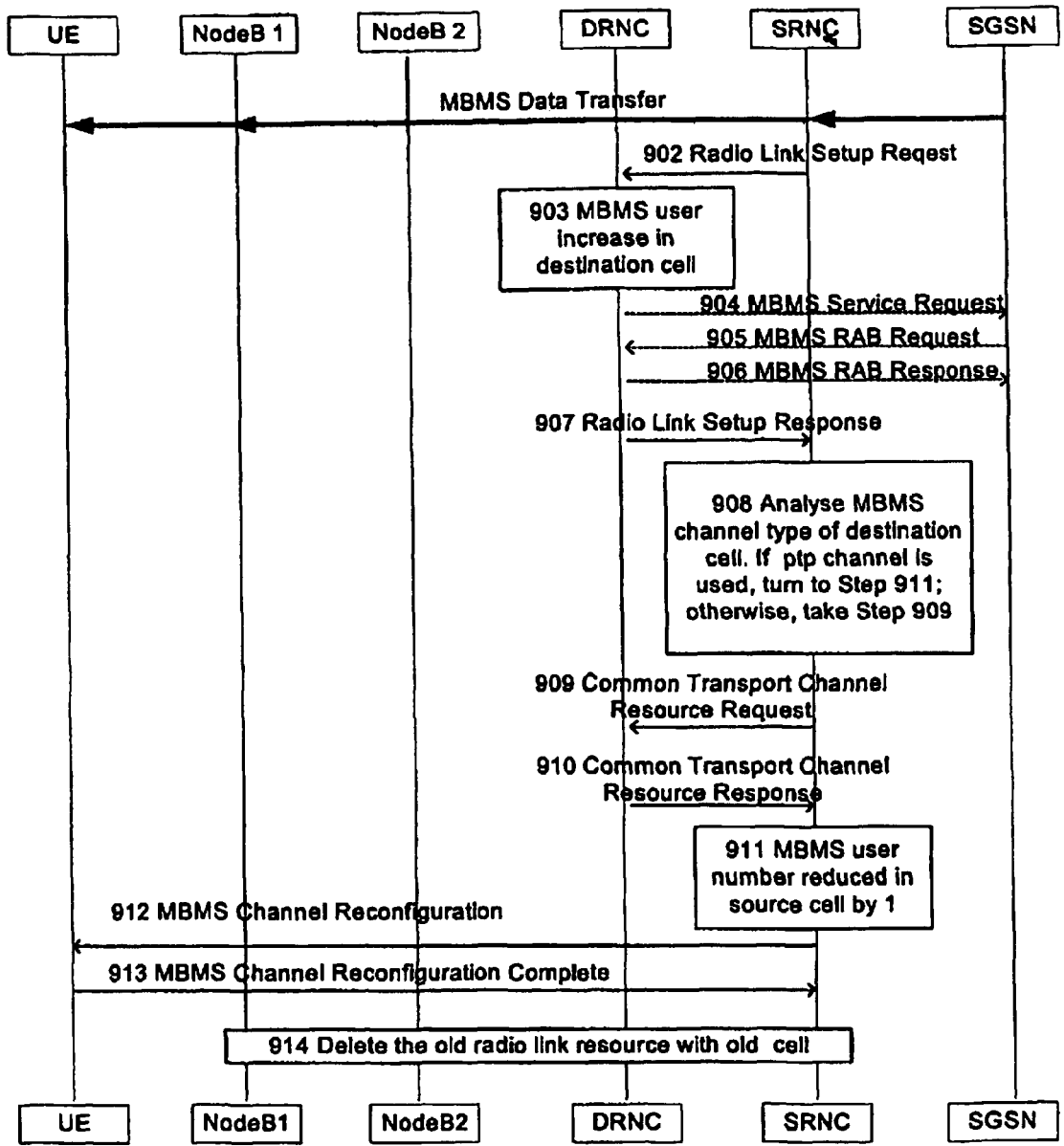
FIG. 1 illustrates a flow diagram for switching MBMS channel type from a dedicated channel (where the UE exists in CELL_DCH status) to a common channel or dedicated channel according to a first embodiment of the present invention.

The present invention proposes various methods to solve the problem of MBMS channel type switching when a UE moves to a cell in a DRNC and the SRNC does not re-position.

The first embodiment makes use of the process of existing cell handover to realize MBMS channel switching through modifying existing messages. Preferably, four messages complete this process. In addition, by modifying existing messages, an RNC is enabled to correctly count the number of MBMS service users during user movement.

The second embodiment realizes MBMS channel switching by adding two new messages. This embodiment does not affect existing handover process, and the switching from the dedicated channel to the common channel and from the common channel to the dedicated channel can be realized by the same process.

The third embodiment completes MBMS channel switching through newly-added messages as well as by combining with existing messages on an Iur interface.

When an Iur interface exists, MBMS channel type may be changed due to users moving in/out of the cell or joining/leaving MBMS service. This situation presents the problems of how to complete MBMS channel switching when the UE is static (there is no handover cell). The fourth embodiment is intended to solve this problem.

The fourth embodiment adds one new message on the Iur interface, through which the DRNC notifies the SRNC of changes of MBMS channel type. If the MBMS channel type changes into a dedicated channel, the SRNC sets up a radio dedicated link for the UE and an Iur MBMS dedicated data bearer. In addition, the SRNC is also responsible for notifying the UE of MBMS channel information. If MBMS channel type changes from a dedicated channel to a common channel, the DRNC informs the SRNC of MBMS common channel information in the newly added message and then the SRNC notifies the UE to reconfigure the MBMS channel.

(1) Channel Type Switching In Moving Situation (1.1) From Dedicated Channel to Common Channel Or Dedicated Channel According to the first embodiment of the present invention, the channel setup process of switching from dedicated channel to common channel combines the setup process for a dedicated channel and that for a common channel. First, the SRNC requests the DRNC to set up a dedicated channel and informs the DRNC to set up dedicated channel-related information and an MBMS service identifier received by the user.

The DRNC re-counts the number of MBMS users according to the MBMS service identifier. If the number is higher than a threshold, the DRNC informs the SRNC in the response message that it cannot set up a dedicated channel for the MBMS service but will set up common channel. After the SRNC knows the change of channel type, it sends the message to the DRNC again to request the DRNC to set up a common channel; and then the DRNC reports common channel information to the SRNC. After the SRNC obtains common channel information, it notifies the UE of the new common channel.

(1.2) From Common Channel To Dedicated Channel Or Common Channel

The channel setup process of switching from common channel to dedicated channel combines the setup process for a dedicated channel and that for a common channel.

The setup process is as follows. First, the SRNC requests the DRNC to set up a common channel and informs the DRNC of the MBMS service identifier. The DRNC re-counts the number of MBMS users according to the MBMS service identifier. If the number is equal to or lower than the threshold, the DRNC informs the SRNC in the response message that it cannot set up a common channel for the MBMS service but a dedicated channel will be set up. After the SRNC receives the change Qf channel type, it sends the message to the DRNC again to request the DRNC to set up a dedicated channel; and then the DRNC reports dedicated channel information to the SRNC. After the SRNC obtains the dedicated channel information, it notifies the UE of the new dedicated channel.

According to the second embodiment, the SRNC decides to handover to a new cell after it receives the cell update message or measurement report. The SRNC includes the MBMS service identifier, the MBMS dedicated channel information and common channel information and it is sent to the DRNC in a combined message. The DRNC re-counts the number of MBMS users according to the MBMS service identifier. The DRNC decides to set up a dedicated channel or a common channel according to the number of users, and sets up the corresponding channel according to channel information transmitted from the SRNC. After successful setup of the channel, the DRNC reports the corresponding common channel or dedicated channel parameters to the SRNC and then the SRNC informs the UE to reconfigure the MBMS channel via an RRC message.

According to the third embodiment, the SRNC decides to handover to a new cell after it receives the cell update message or measurement report. The SRNC inquires about MBMS channel type from the DRNC. This message comprises the MBMS service identifier that the UE is receiving. The DRNC re-counts the number of MBMS users according to the MBMS service identifier. The DRNC determines the type of MBMS channel for setup according to the number of MBMS service users, and reports to the SRNC whether the MBMS channel type is a dedicated channel or a common channel. If a dedicated channel is used, the SRNC sets up a corresponding dedicated channel and an Iur dedicated data bearer; if a common channel is used, the SRNC sends a message to the DRNC to ask for MBMS common channel information, and sends this information to the UE via the RRC.

(2) Channel Type Switching In Non-Moving Situation

According to the fourth embodiment, switching from the dedicated channel to the common channel includes counting the number of MBMS users by the DRNC. If the number exceeds a certain threshold, the DRNC sets up a common channel. The DRNC notifies the SRNC of common channel information and SRNC notifies the UE to reconfigure channel.

To switch from a common channel to a dedicated channel, the DRNC counts the number of MBMS users. If the number is equal to or lower than a certain threshold, the DRNC sets up a dedicated channel The DRNC reports to the SRNC and the SRNC sets up an MBMS dedicated channel to notify the UE of dedicated channel information.

(3) Count User Number While Moving

During a cell handover procedure, an information element, i.e. MBMS service identifier, is added to the first message sent from the SRNC to the DRNC based on the existing message, which is used by the DRNC to count the number of MBMS service users.

(4.1) Modification To Existing Message (4.1.1) Iur Interface Message

Common transfer channel resource request message

A new information element, i.e., MBMS service identifier, is added to the conventional message. The MBMS service identifier includes two parts, an APN (Access Point Name) and an IP (Internet Protocol) multicast address.

Common Transfer Channel Resource Response Message

A new information element, MBMS channel type, is added to the conventional message, preferably as a Boolean value. For example, "1" means dedicated channel type and "0" means common channel type.

Radio Link Set Up Request

The radio link setup request message adds a new information element, i.e., a MBMS service identifier to the conventional. The MBMS service identifier includes two parts, an APN and IP multicast address.

Radio Link Setup Response Message

A new information element, i.e., MBMS channel type, is added to the conventional message, preferably as a Boolean value. For example, "1" means dedicated channel type and "0" means common channel type.

(4.1.2) RRC Message

Cell update confirmation message

A new information element, i.e., MBMS channel type, is added to the conventional message, preferably as a Boolean value. For example, "1" means dedicated channel type and "0" means common channel type. MBMS channel information is also added. This is an optional type. If the MBMS channel type is dedicated, this message includes MBMS dedicated channel information, whose detailed information elements may be the same as the conventional message. If the MBMS channel type is common, this message also includes MBMS common channel information.

(4.2) New Messages Defined For MBMS Channel Switching (4.2.1) MBMS Channel Setup Request Message The second embodiment includes a new message, an MBMS channel setup request. This is a message on the Iur Interface, through which the SRNC notifies the DRNC of the type of MBMS service the UE is receiving and information of MBMS dedicated channel and common channel set up for the user. The SRNC gives the DRNC all information needed to set up the MBMS dedicated channel and common channel in the message and the DRNC re-counts the number of MBMS users to determine the type of MBMS channel to use. Set up of corresponding MBMS channels is performed according to parameters provided by this message.

This message includes the following information elements:

1. MBMS service identifier with two parts, i.e., APN and IP multicast address.

2. MBMS dedicated channel information, the main contents of which include:
   Downlink transport combination format set
   Downlink dedicated physical channel time slot format
   Downlink frequency spreading code number
   Start point of downlink data receiving window
   End point of downlink data receiving window
   Dedicated transfer channel identifier
   Statistical description of transfer source
   Transfer channel format set
   Code error rate of transmission block 3. Common channel information:
   Drift radio network temporary identifier
   Transfer bearer requirements indication
   Transfer bearer logo.

(4.2.2) MBMS Channel Setup Response Message

A new message defined by this invention for MBMS, the MBMS channel setup response, is the response to the above message and is transferred from the DRNC to the SRNC. After setting up the corresponding MBMS channel, the DRNC uses the type of MBMS channel and sends back corresponding information on a dedicated channel or a common channel to the SRNC to configure the UE MBMS channel through the RRC. The message notifies the SRNC to set up the following:

1. MBMS service identifier

2. MBMS dedicated channel information

This is optional. If the DRNC decides to set up a dedicated channel for MBMS service, this option is included in the message; if a common channel is set up, this option is not included. The main contents are:
   A Dedicated transfer channel identifier
   Binding identifier, i.e. the unique identifier allocated by DRNC for data transfer bearer
   Transport layer address 3. MBMS common channel information This is optional. If the DRNC decides to set up a common channel for MBMS service, this option is included in the message; if a dedicated channel is set up, this option is excluded. The main contents are:
   Secondary Common Control Physical Channel (SCCPCH) offset
   Download scrambling code
   Download frequency spreading code number
   Transport format combination set
   SCCPCH time-slot format
   FACH/PCH transport format set (4.2.3) MBMS Channel Information Query Message A new message defined by this invention for the third embodiment, i.e., MBMS channel information query, is used for the Iur Interface. It is sent by the SRNC to the DRNC to inquire the possible types of channel that the DRNC may set up for this MBMS. This message includes the following information elements:
   MBMS service identifier (4.2.4) MBMS Channel Information Report Message A new message defined by this invention for the third embodiment, i.e., MBMS channel information report, is used by the DRNC to report all MBMS service types used to the SRNC. This message includes the following information elements:

1. MBMS Service Identifier

2. MBMS Channel Type where "1" means dedicated channel and "0" means common channel.

(4.2.5) MBMS Channel Information Indication Message

A new message defined by this invention for the fourth embodiment, i.e., MBMS channel information indication, is used by the DRNC to report the MBMS service type used to the SRNC. The message includes the following information elements:

1. MBMS Service Identifier

2. MBMS Channel Type

3. MBMS Common Channel Information

The message includes this element if DRNC uses a common channel to transfer MBMS data.

(4.2.6) MBMS Service Request Message

A new message defined by this invention for MBMS, an MBMS service request, is used by the DRNC to apply for core network for MBMS service.

This message includes the following information elements:

1. MBMS Service Identifier

2. Network Field Identifier

3. Route Field Identifier

4. Service Field Identifier

5. Iu Signalling Identifier

6. Global RNC Number (4.2.7) MBMS Channel Re-Configuration Request Message

A new message defined by this invention for MBMS, an MBMS channel re-configuration request, is used by the SRNC to report the MBMS channel information to the UE.

This message includes the following information elements:

1. MBMS Service Identifier

2. Channel Type

3. MBMS Common Channel Information—this is included if the DRNC uses a common channel to transfer MBMS data.

20. MBMS Dedicated Channel Information—included if the DRNC uses a dedicated channel to transfer MBMS data.

(4.2.8) MBMS Channel Re-Configuration Response Message

A new message defined by this invention for MBMS, MBMS channel re-configuration response, is used by the UE to notify the SRNC that MBMS channel re-configuration has been completed. This message includes following information elements:

21. MBMS Service Identifier

Figure 2:
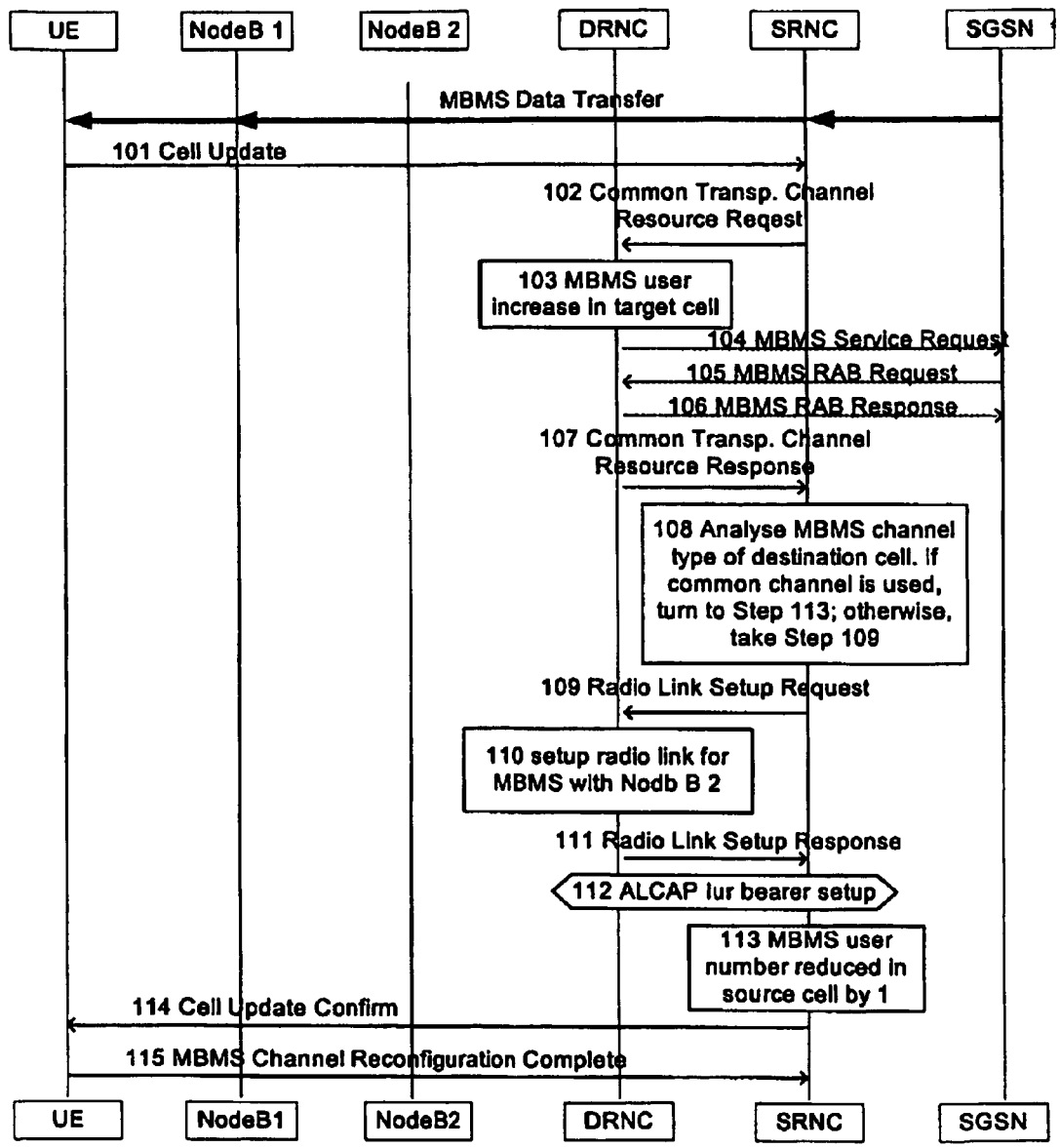
FIG. 2 illustrates a flow diagram for switching MBMS channel type from a common channel (where the UE exists in CELL_FACH status) to a dedicated channel or a common channel according to a first embodiment of the present invention.

FIG. 1 and FIG. 2 illustrate a process for MBMS channel type switching according to a first embodiment of the present invention when a user moves to a cell in the DRNC and the SRNC does not re-position. The first time, MBMS data is transferred from the SGSN to the UE through Node B1.

(1) Switching From Dedicated Channel to the Dedicated Channel or Common Channel

FIG. 1 is a flow diagram for the process of switching MBMS channel type from a dedicated channel (UE exists in CELL_DCH status) to a common channel or a dedicated channel according to the first embodiment. Referring to FIG. 1, at step 902, the UE exists in CELL_DCH status and enters a destination cell in the DRNC. According to the conventional art, the SRNC decides not to re-position itself and conducts the cell handover process in accordance with the measurement report from the UE. The SRNC sends a "Radio Link Setup Request" message to the DRNC and adds a new information element, MBMS service identifier, to the conventional message format to notify the DRNC of the MBMS service identifier that the UE is receiving. At step 903, the DRNC can identify the kind of MBMS service the user has applied for according to the MBMS service identifier and increases the number of corresponding service users by 1.

At step 904, if the user is the first user to apply for the service in the local RNC, the DRNC sets up its data channel with the core network (CN) comprised of the SGSN. The DRNC sends an "MBMS Service Request" message to the SGSN with the MBMS identifier. The SGSN then sets up the data channel.

At step 905, the SGSN sends an "MBMS RAB Request" or Radio Access Bearer (RAB) allocation request message to the DRNC.

At step 906, after successful setup of the data channel, the DRNC sends the "MBMS RAB Response" or RAB allocation response message to the SGSN.

In step 907, the DRNC sends a "Radio Link Setup Response" message to the SRNC. This message adds a new information element based on the existing format, i.e. MBMS channel type, through which the DRNC notifies the SRNC of the channel type of the MBMS service used by the cell where the UE is located.

In step 908, the SRNC analyzes the MBMS channel type. If the cell in the DRNC where the UE is located uses a dedicated channel, the SRNC proceeds to Step 911. Otherwise, the SRNC performs step 909.

In step 909, the SRNC knows through analysis of the MBMS channel type, that the cell in the DRNC where the UE is located uses a common channel, and notifies the DRNC to report common channel information using a "Common Transport Channel Resource Request" message.

In step 910 DRNC sends a "Common Transport Channel Resource Response" message to the SRNC, through which it reports MBMS common channel parameters to the SRNC.

In step 911, the source cell in the SRNC reduces the number of the corresponding MBMS service users by 1 due to the UE leaving the area.

In step 912, the SRNC notifies the UE of the MBMS channel information through a RRC_(Radio Resource Control) message, a physical channel re-configuration request or an MBMS channel re-configuration message.

In step 913, the UE reconfigures the MBMS channel if the MBMS channel parameters are not the same as those used before handover. Upon success, a success message is returned. The UE sends an "MBMS Channel Reconfiguration Complete" message to the SRNC to report the completion of MBMS channel configuration. At this time, cell handover process is completed. If the new MBMS channel is a dedicated channel, MBMS data is transferred by the SRNC through the DRNC to the UE via the Iur interface. If a common channel is used, MBMS data is directly transferred to the DRNC by the SGSN and then transferred by the DRNC to the UE.

In step 914, the SRNC deletes the radio dedicated link of the source cell.

(2) Switching From the Common Channel to the Common Channel or Dedicated Channel FIG. 2 is a flowchart for the process of switching MBMS channel type from common channel (UE exists in CELL_FACH status) to dedicated channel or common channel according to the first embodiment. Referring to FIG. 2 in step 101, the UE enters a target cell in the DRNC under non-CELL_DCH status. According to convention, the UE needs to perform a cell update process. The UE goes into CELL_FACH status, and then sends a cell update message to the SRNC. This message format may be the same as that in the prior art. In step 102, the SRNC sends "Common Transport Channel Resource Request" message to the DRNC by adding a new MBMS service identifier to the existing message format, which is used to notify the DRNC of the MBMS service identifier that the UE is receiving.

In step 103, the DRNC can determine which kind of MBMS service the user has applied for according to the MBMS service identifier and adds 1 to the number of corresponding service users.

In step 104, if the user is the first user to apply for the service in the local RNC, the DRNC sets up its data channel with a core network (CN) including the SGSN and reports the MBMS service identifier to the SGSN. The DRNC sends an "MBMS Service Request" message to the SGSN and the SGSN takes up the task of setting up the data channel.

In step 105, the SGSN sends an "MBMS RAB Request" or RAB allocation request message to the DRNC.

In step 106, after successful setup of data channel, the DRNC sends an "MBMS RAB Response" or RAB allocation response message to CN.

In step 107, the DRNC sends a "Common Transport Channel Resource Response" message to the SRNC. This message adds a new information element based on the existing format, i.e., MBMS channel type, through which the DRNC notifies the SRNC of the channel type of the MBMS service used by the cell where the UE is located.

In step 108, the SRNC analyzes the MBMS channel type. If the cell in the DRNC where the UE is located uses a common channel, step 113 is performed directly.

In step 109, the SRNC knows from analysis of the MBMS channel type that the cell in the DRNC where the UE is located uses a dedicated channel and notifies DRNC to set up P-t-P MBMS channel by notifying the DRNC of dedicated channel information in "Radio Link Setup Request" message.

In step 110, the DRNC sets up a dedicated radio link with Node B2 covering the target cell in the DRNC.

In step 111, after the successful setup of the link, the DRNC returns a "Radio Link Setup Response" message to notify the SRNC of success.

In step 112, data link bearer is set up between the SRNC and the DRNC for MBMS data transfer.

In step 113, the source cell in the SRNC reduces the number of corresponding MBMS service users by 1 due to leaving of the UE.

In step 114, the SRNC notifies the UE of MBMS channel information through a cell update confirmation message.

In step 115, the UE reconfigures the MBMS channel if the MBMS channel parameters are not the same as those used before handover. Upon success, a success message is returned, an "MBMS Channel Re-Configuration Complete" message. At this time, cell handover process is completed. If the new MBMS channel is a dedicated channel, MBMS data is transferred by SRNC through the DRNC to the UE via the Iur interface. If a common channel is used, MBMS data is directly transferred to the DRNC by the SGSN and then transferred by the DRNC to the UE.

Figure 3:
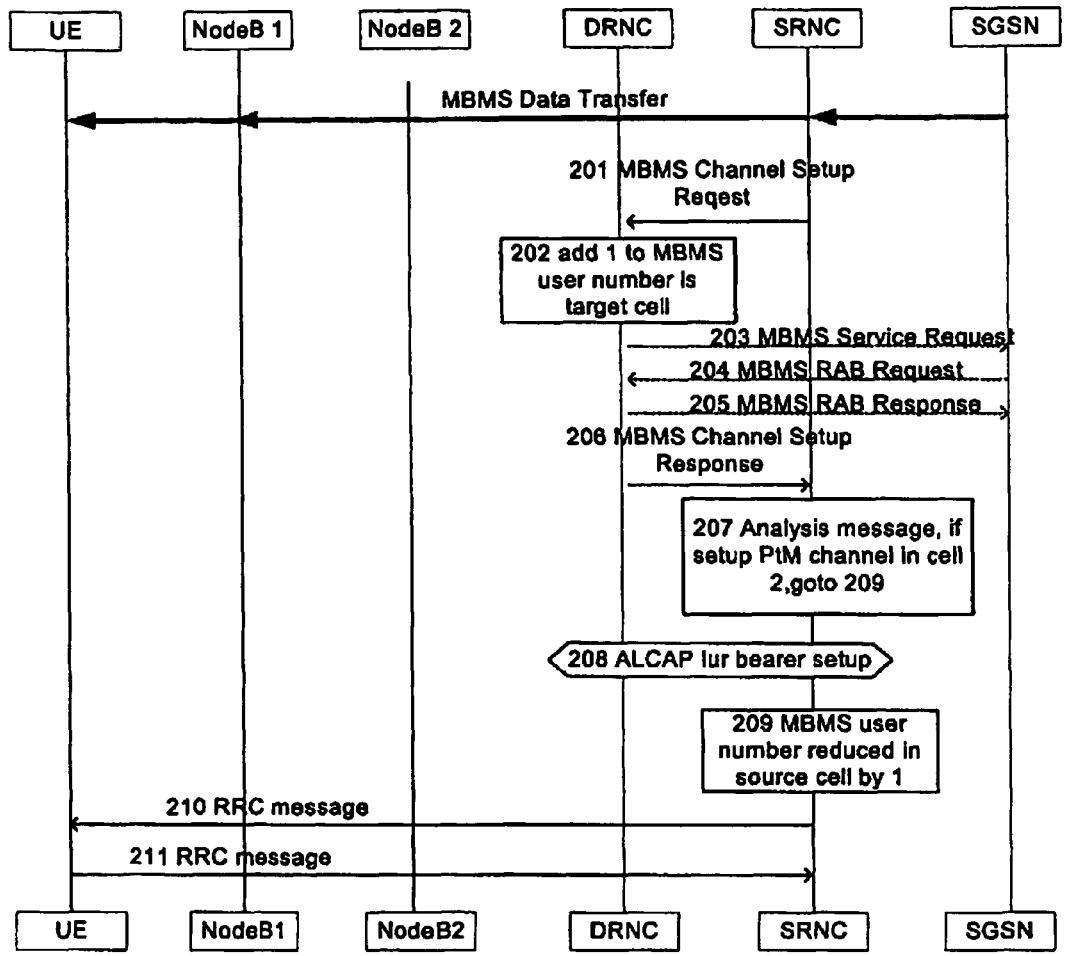
FIG. 3 illustrates a flow diagram for MBMS channel type switching between a common channel and dedicated channel according to a second embodiment of the present invention.

FIG. 3 shows the process of causing the MBMS channel type to be changed when the user handovers to a cell in the DRNC. Following is the description for this process in detail, i.e. the process of switching between the common channel and common channel or dedicated channel Referring to FIG. 3 in step 201, the SRNC decides not to re-position itself according to cell update message or measurement report sent from the UE and performs cell handover or a cell update process. Messages and processes specially used for MBMS channel switching are added on the basis of not affecting the existing handover process. The SRNC sends an "MBMS Channel Setup Request" message to the DRNC, that includes the identifier of MBMS service, which can make it easy for the DRNC to count users; MBMS dedicated channel information; and MBMS common channel information. It is up to the DRNC to decide to use a common channel or a dedicated channel.

In step 202, the DRNC can determine which kind of MBMS service the user has applied for according to the MBMS service identifier and adds the number of corresponding service users by 1.

In step 203, if the user is the first user to apply for the service in the local RNC, the DRNC sets up its data channel with the core network (CN) including the SGSN. The DRNC sends "MBMS Service Request" message to SGSN to inform it of the MBMS identifier. The SSGSN sets up the data channel.

In step 204, the SGSN sends an MBMS RAB setup request or RAB allocation request message to the DRNC In step 205, after successful setup of the data channel, the DRNC sends MBMS RAB setup response or radio access bearer (RAB) allocation response message to the SGSN.

In step 206, the DRNC decides to set up a dedicated or common channel according to the number of the MBMS service users in the target cell. After successful setup, if the MBMS uses a dedicated channel, the DRNC notifies the SRNC of the dedicated channel information using an "MBMS Channel Setup Response" message; if a common channel is used, the DRNC notifies the SRNC of common channel information using an "MBMS Channel Setup Response" message.

In step 207, the SRNC analyzes the MBMS channel type. If the cell in the DRNC where the UE is located uses a common channel, the SRNC performs step 209.

In step 208, the SRNC knows that the cell in the DRNC where the UE is located uses a dedicated channel through analysis of MBMS channel type and then sets up a data link bearer between the SRNC and the DRNC to transfer MBMS data.

In step 209, the cell in the SRNC reduces the number of the corresponding MBMS service users by 1 because of the UE leaving the area.

In step 210, the SRNC notifies the UE of MBMS channel information via an RRC message, cell update confirmation message or other RRC message.

In step 211, the UE reconfigures the MBMS channel if the MBMS channel parameters are not the same as those used before handover. After its success, a success RRC message is returned. If the new MBMS channel is a dedicated channel, MBMS data is transferred by the SRNC through the DRNC to the UE via the Iur interface. If a common channel is used, MBMS data is directly transferred to the DRNC by the SGSN and then transferred by the DRNC to the UE.

Figure 4:
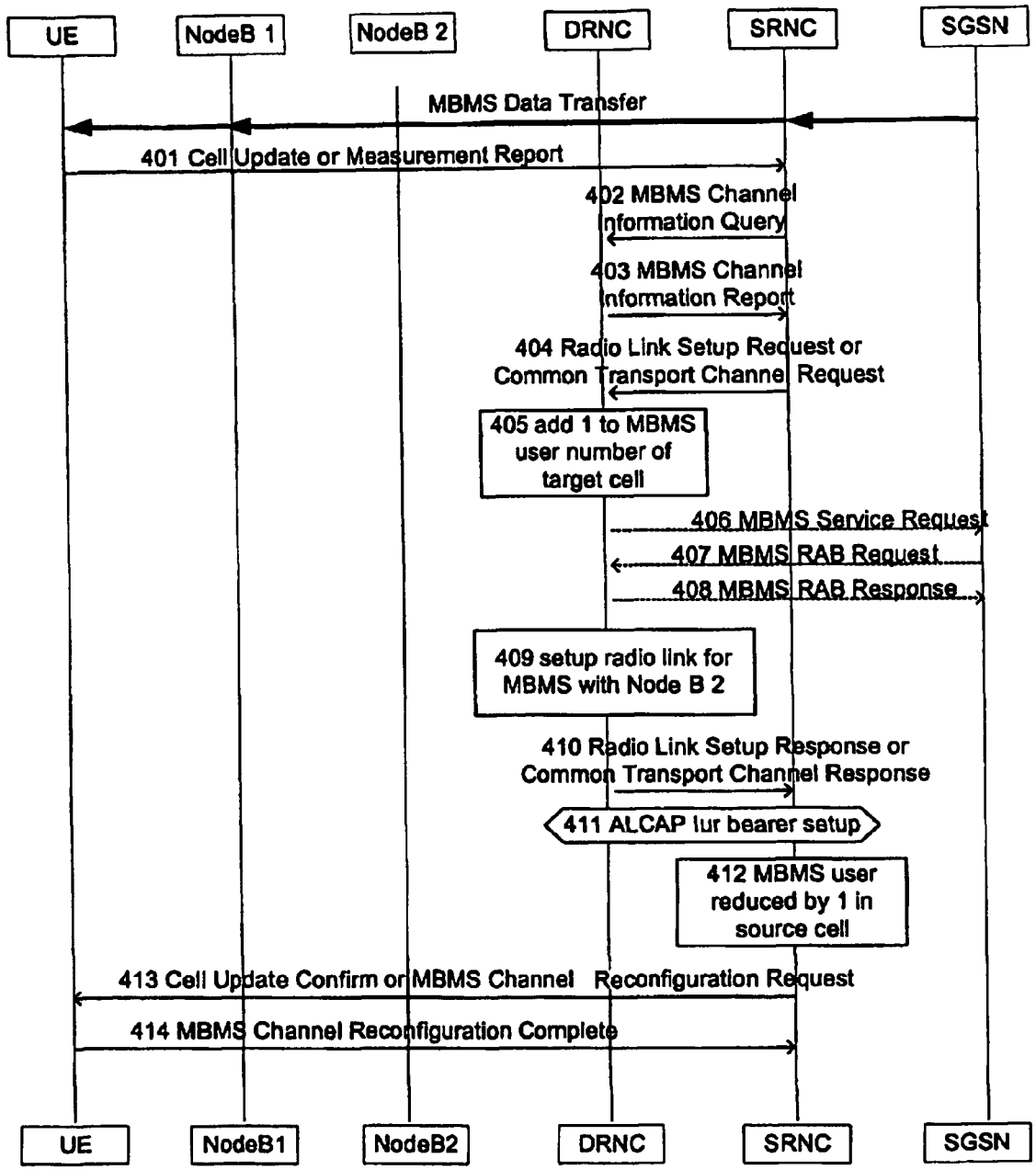
FIG. 4 illustrates a flow diagram for MBMS channel type switching from a common channel to dedicated channel or common channel according to a third embodiment of the present invention.

FIG. 4 shows the process of changing the MBMS channel type when a user handovers to a cell in the DRNC. Following is the description for this process in detail; the process of switching between the common channel and the dedicated channel Referring to FIG. 4, in step 01, the UE sends different message reports to the SRNC according to different statuses when entering another cell.

In step_402, the SRNC knows that the user is receiving MBMS service and queries the DRNC about the channel information of the MBMS service by sending an "MBMS Channel Information Query" message. This message includes an MBMS service identifier, according to which the DRNC counts the number of users and selects a dedicated channel or a common channel.

In step 403, the DRNC reports the channel type it provides for MBMS service to SRNC in an "MBMS Channel Information Report" message.

In step 404, the SRNC sends different messages to set up a common channel or a dedicated channel according to the different channel type the DRNC supports. If a dedicated channel is set up, a "Radio Link Setup Request" message is sent; if a common channel is set up, a "Common Transport Channel Request" message is sent.

In step 405, the DRNC adds 1 to the number of the service users.

In steps 406 to 408, if the user is the first one who asks for the MBMS service, the DRNC requires it to join the MBMS multicast group and to set up corresponding RAB by exchanging an "MBMS Service Request" message, an "MBMS RAB Request" message, and an "MBMS RAB Response" message.

In step 409, if the SRNC indicates that the DRNC shall set up a dedicated channel, the DRNC needs to set up a radio link to a Node B2 covering the cell where the UE is located.

In step 410, the DRNC informs the SRNC of the radio link using a "Radio Link Setup Response" message or common channel using a "Common Transport Channel Response" message.

In step 411, if the MBMS uses a dedicated channel, a user plane of the Iur interface is set up.

In step 412, the SRNC reduces the number of users in the source cell where the UE is located by 1.

In step 413, the SRNC directs the UE to reconfigure the physical channel and sends different messages according to different statuses of the UE. The different messages may include a "Cell Update Confirm" message and an "MBMS Channel ReConfiguration Request" message.

In step 414, the UE reports the successful MBMS channel re-configuration to the SRNC using "MBMS Channel Re-Configuration Complete" message.

Figure 5:
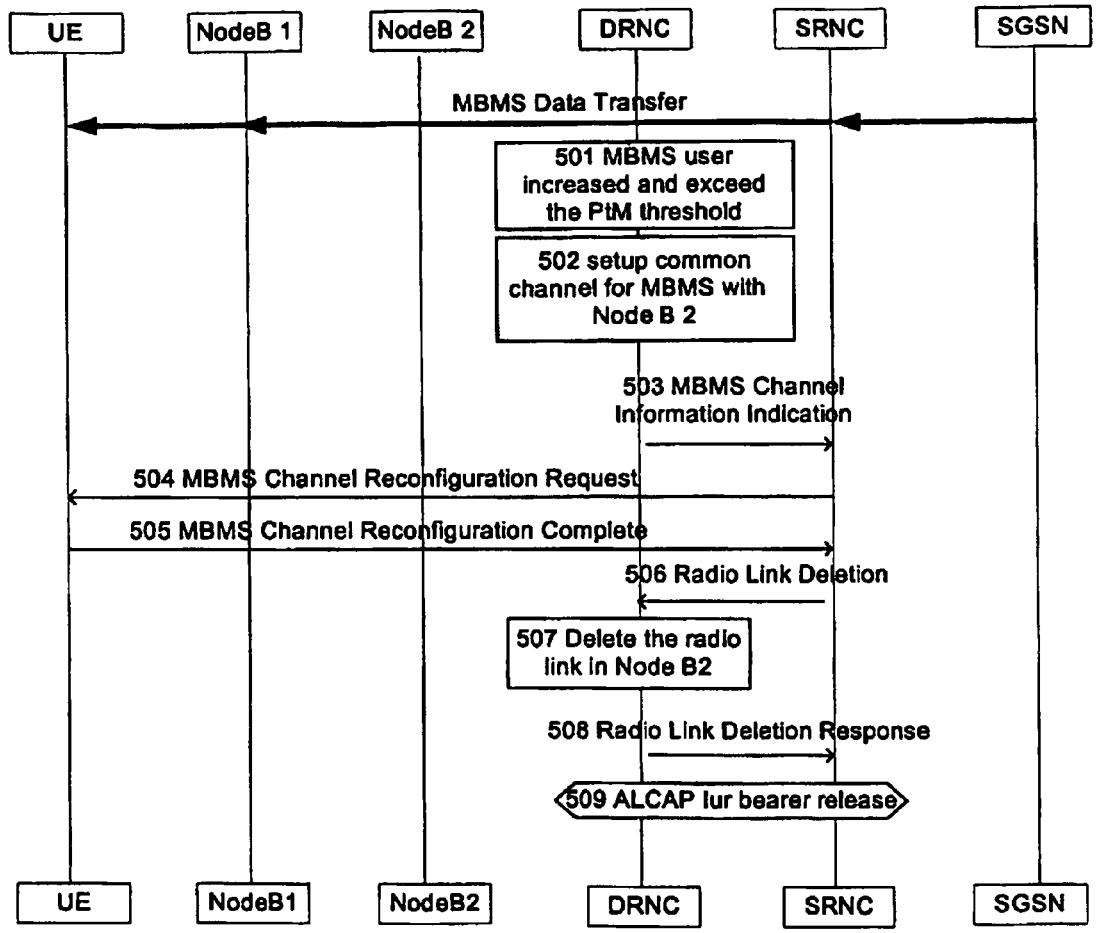
FIG. 5 illustrates a flow diagram for MBMS channel type switching from a dedicated channel to common channel according to a fourth embodiment of the present invention.

FIG. 5 illustrates the process of switching MBMS channel type due to the movement of other users or introduction of new services. Following is the detailed description for this process, the process of switching from the dedicated channel to the common channel.

Referring to FIG. 5, in step 501, the DRNC decides to switch to a common channel when it finds that the user number exceeds a certain threshold when a new user joins the MBMS service group and moves into the cell in the DRNC.

In step 502, the DRNC sets up a common channel for MBMS service with Node B2 covering the cell where the UE is located.

In step 503, the DRNC notifies the SRNC of the channel type change by using an "MBMS Channel Information Indication" message that includes a common channel information.

In steps 504 to 505, the SRNC reconfigures the MBMS channel of the UE by exchanging MBMS channel re-configuration request/complete messages and changes the channel type from dedicated to common.

In steps 506 to 508, the SRNC notifies the DRNC to delete the original dedicated channel configured for the MBMS service by sending a "Radio Link Deletion Response" message. The DRNC deletes dedicated channel resources in its Node B2 and sends a "Radio Link Deletion Response" message to the SRNC.

In step 509, the transmission bearer of the Iur interface on the user plane between DRNC and SRNC is released.

Figure 6:
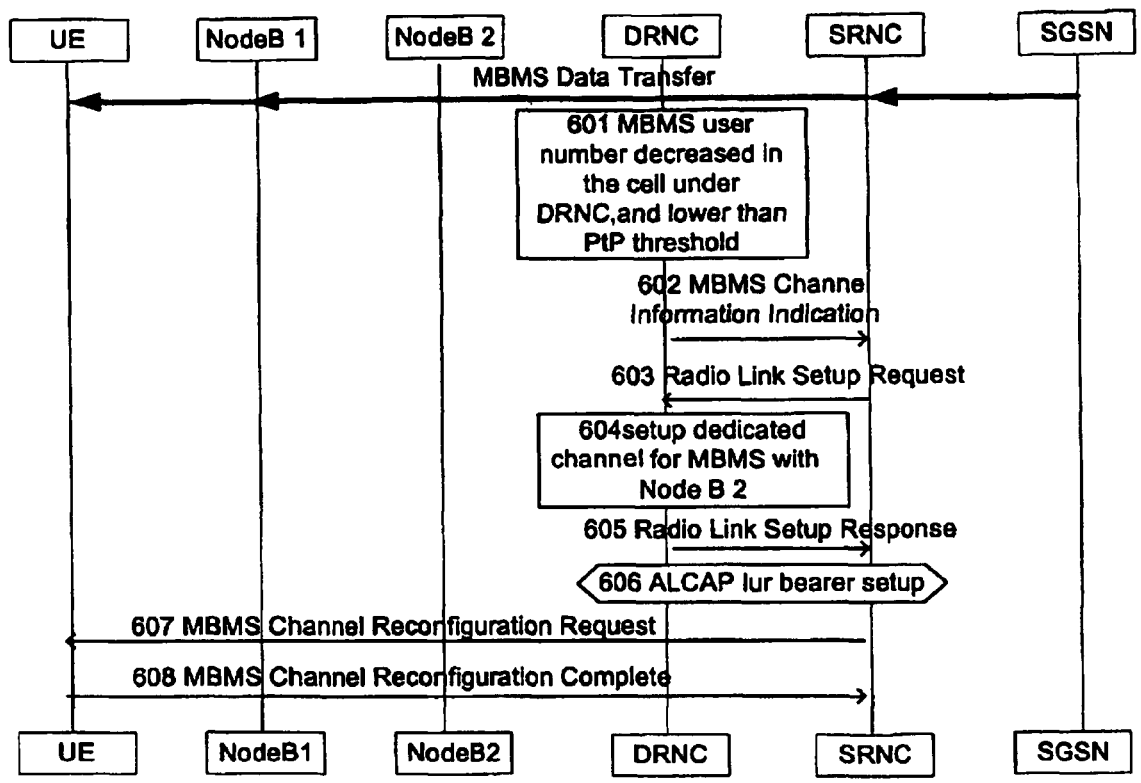
FIG. 6 illustrates the flow diagram for MBMS channel type switching from a common channel to dedicated channel according to a fourth embodiment of the present invention.
Figure 7:
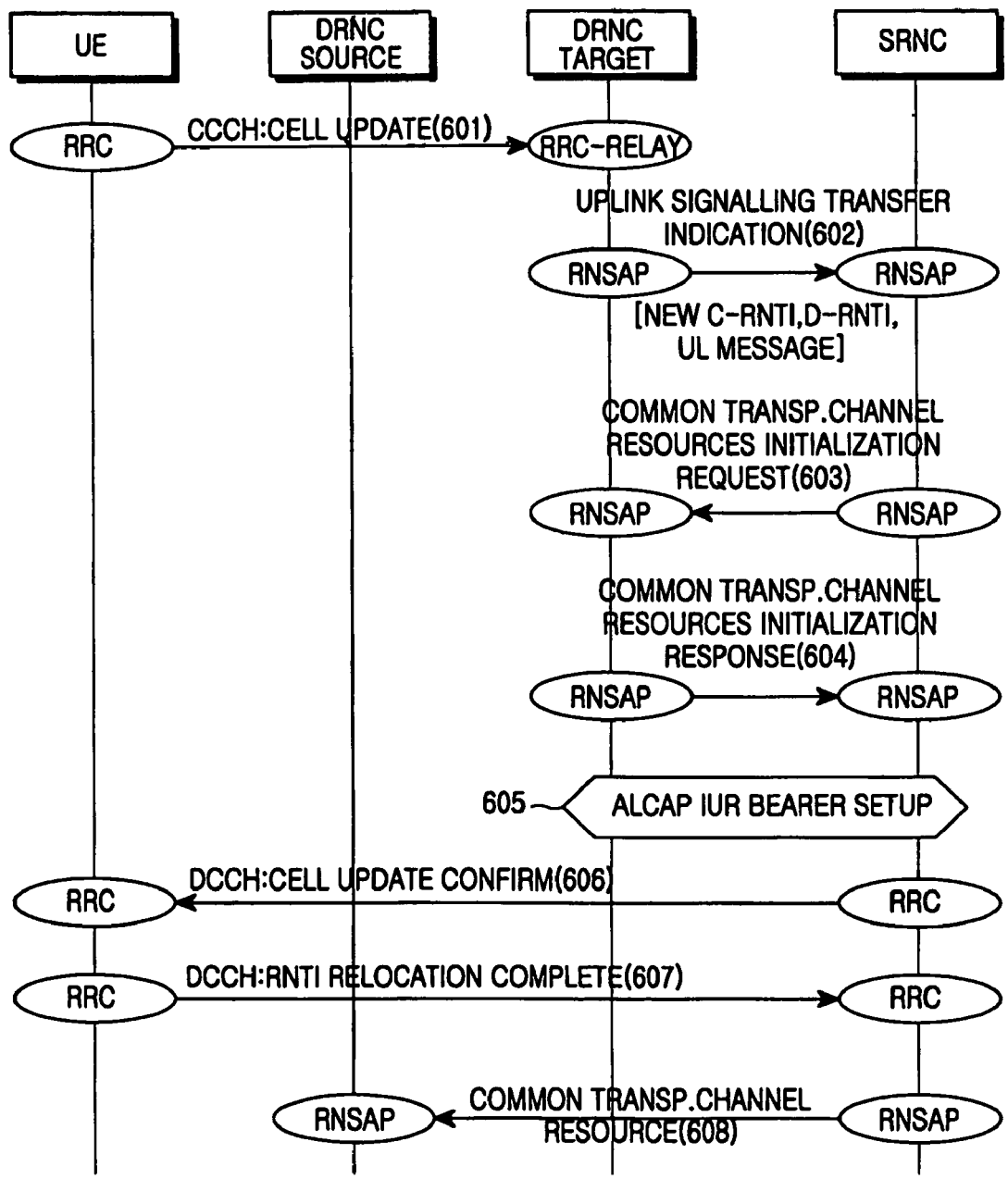
FIG. 7 illustrates a cell update process on a conventional Iur interface (No SRNC re-positioning)
Figure 8:
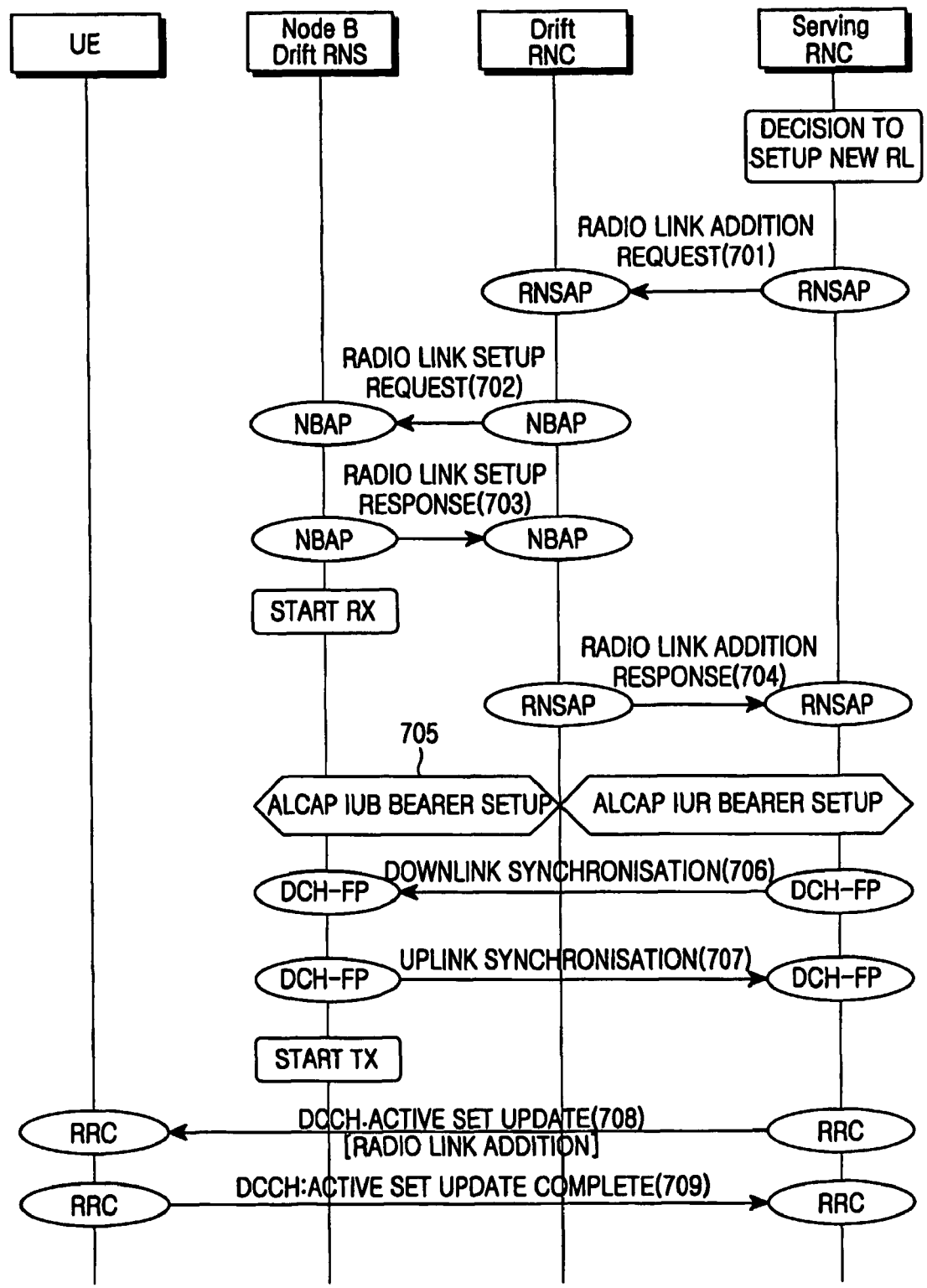
FIG. 8 shows a soft handover process on a conventional Iur interface (No SRNC re-positioning); and, FIG. 9 illustrates a conventional MBMS system structure.
Figure 9:
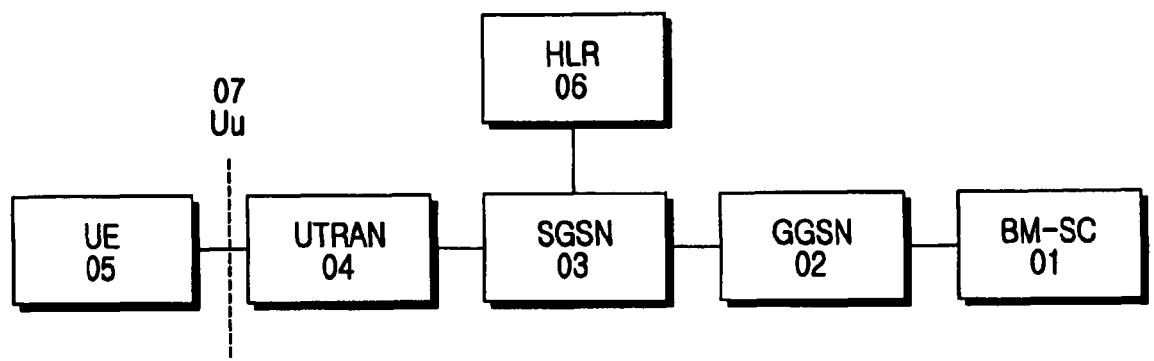

FIG. 6 shows the case of switching from the common channel to the dedicated channel.

Referring to FIG. 6, in step 601, the DRNC decides to switch the channel type to when it finds that the user number is lower than a certain threshold, such as when a user leaves the MBMS service group and moves out of the cell in the DRNC.

In step 602, the DRNC notifies the SRNC of the channel type change by using an "MBMS Channel Information Indication" message.

In steps 603 to 605, the SRNC directs the DRNC to set up a dedicated channel for MBMS service of the user by sending a "Radio Link Setup Request" message. DRNC sets up the corresponding dedicated radio link in its Node B2 and sends radio link setup response message to the SRNC.

In step 606, the user plane transmission bearer of the Iur interface is set up between the SRNC and the DRNC.

In steps 607 to 608, the SRNC directs the UE to reconfigure the MBMS service channel by exchanging MBMS channel re-configuration request/complete messages.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A channel type switching method for a Multimedia Broadcast and Multicast Service (MBMS) Point to Point (P-t-P) and Point to Multi point (P-t-M) channel, when a UE having MBMS service moves to a cell in a Destination Radio Network Controller (DRNC) that has an Iur interface with a Serving Radio Network Controller (SRNC), comprising the steps of:
   determining in the DRNC, to perform switching channel type between the P-t-M channel and the P-t-P channel based on a number of users having the MBMS service in the cell;
   notifying the SRNC of the determined MBMS channel type from the DRNC;
   notifying in the SRNC, the UE to reconfigure an MBMS channel via a Radio Resource Control (RCC) message in order to perform channel type switching to the determined MBMS channel type; and
   transmitting MBMS data with the determined channel type to UEs requiring MBMS service.

2. The method as set forth in claim 1, wherein said channel switching is at least determined based on comparing a number of UEs requiring MBMS service to a threshold.

3. The method as set forth in claim 1, wherein said channel switching further comprises:
   the SRNC transmitting a radio link setup request message to the DRNC including at least one MBMS service identifier.

4. The method as set forth in claim 3, wherein said message transferred from the SRNC to the DRNC comprises an MBMS service identifier, which enables the DRNC to count a number of MBMS users.

5. The method as set forth in claim 3, wherein, if the UE is first in requesting MBMS service in the DRNC, the DRNC sets up a radio access bearer (RAB) connection with a core network.

6. The method as set forth in claim 1, wherein said channel switching further comprises:
   sending, by the SRNC, a radio link setup request message to the DRNC to request a radio link setup; and
   determining, by the DRNC, a channel type at least based on a number of UEs that require MBMS service and informing the SRNC of the channel type.

7. The method as set forth in claim 1, wherein said channel switching further comprises:
   the SRNC sending a message to inquire about MBMS service type from the DRNC;
   the DRNC determining a channel type to be set up and informing the SRNC of the parameters of MBMS channel set up; and
   the SRNC completing setting up the P-t-P channel or obtaining a P-t-M channel information from the DRNC.

8. A channel type switching method for a Multimedia Broadcast and Multicast Service (MBMS) Point to Point (P-t-P) and Point to Multi point (P-t-M) channel in a radio network controller, comprising:
   checking a number of User Equipments (LIEs) in a cell to determine an MBMS channel type;
   determining the MBMS channel type by comparing the number of UEs that require MBMS service to a threshold;
   reporting change of the MBMS channel type to a serving radio network controller (SRNC); and
   receiving in the SRNC, the MBMS channel type from a Destination Radio Network Controller (DRNC), and notifying in the SRNC, the UE to reconfigure an MBMS channel via a Radio Resource Control (RRC) message in order to perform channel type switching to the MBMS channel type.

9. The method as set forth in claim 8, further comprising:
receiving, at the SRNC, the MBMS channel type from a destination radio network controller (DRNC); and
transmitting a channel reconfiguration request message to the UE.

10. A channel type switching method for a Multimedia Broadcast and Multicast Service (MBMS) Point to Point (P-t-P) and Point to Multi point (P-t-M) channel, comprising the steps of:
transmitting, from a Serving Radio Network Controller (SRNC), a radio link setup message to a Destination Radio Network Controller (DRNC);
transmitting from the DRNC, an MBMS channel type to the SRNC upon receiving the radio link setup message in the DRNC;
notifying, at the SRNC, a User Equipment (UE) that requires MBMS service to reconfigure the MBMS channel type via a Radio Resource Control (RRC) message;
receiving, at the UE, the MBMS channel type; and
receiving MBMS data on an MBMS channel using the MBMS channel type, wherein the MBMS channel type is one of the P-t-P channel or the Pt-M channel.

11. The method as set forth in claim 10, wherein the radio link setup message comprises an MBMS service identifier.

\* \* \* \* \*